(12) United States Patent
Carraro

(10) Patent No.: US 6,194,879 B1
(45) Date of Patent: Feb. 27, 2001

(54) DEVICE FOR THE VOLTAGE ADJUSTMENT IN A SLOW-RUNNING ALTERNATOR

(76) Inventor: Diego Carraro, Via Roma 20, 36051 Creazzo (VI) (IT)

(*) Notice: Subject to any disclaimer, the term of this patent is extended or adjusted under 35 U.S.C. 154(b) by 0 days.

(21) Appl. No.: 09/245,342

(22) Filed: Feb. 5, 1999

(30) Foreign Application Priority Data

Feb. 9, 1998 (IT) ............................................... VI98A0025

(51) Int. Cl.$^7$ ....................................................... H02P 9/10
(52) U.S. Cl. ................................ 322/59; 322/28; 322/27
(58) Field of Search ........................... 322/25, 27, 28, 322/59, 99

(56) References Cited

U.S. PATENT DOCUMENTS

| | | | |
|---|---|---|---|
| Re. 36,454 | * 12/1999 | Ball et al. .............................. | 322/23 |
| 4,015,187 | * 3/1977 | Sasaki et al. ........................... | 322/14 |
| 4,114,076 | * 9/1978 | Teranishi et al. ...................... | 318/421 |
| 4,354,182 | * 10/1982 | Frey ........................................ | 340/650 |
| 4,410,848 | * 10/1983 | Friedrich ................................. | 322/25 |
| 4,677,364 | * 6/1987 | Williams et al. ....................... | 322/47 |
| 4,801,855 | * 1/1989 | Nohmi et al. .......................... | 318/338 |
| 5,583,420 | * 12/1996 | Rice et al. .............................. | 322/25 |

FOREIGN PATENT DOCUMENTS 3-045199 2/1991 (JP).
7-298584 11/1995 (JP).

OTHER PUBLICATIONS

Murthy S. S. et al., "A Novel Self–Excited Self–Regulated Single Phase Induction Generator Part II: Experimental Investigation", IEEE Transactions on Energy Conversion, US, IEEE Inc., New York, vol. 8, No. 3, Sep. 1, 1993, pp. 383–387.

* cited by examiner

*Primary Examiner*—Nicholas Ponomarenko
(74) *Attorney, Agent, or Firm*—Dymeka Gossett, PLLC

(57) ABSTRACT

Apparatus for adjusting the terminal voltage of a single phase alternator employs a current sensor for sensing the load current. The load current signal is compared with a set point for producing an accelerator signal as the load changes. A drive for the alternator is controlled by an accelerator responsive to the accelerator signal. When the system is in a no load condition, the accelerator signal reduces the speed of the drive. A circuit responsive to the terminal voltage drives an exciter circuit to maintain the terminal voltage at not less than 50% of a desired or rated voltage.

15 Claims, 1 Drawing Sheet

DEVICE FOR THE VOLTAGE ADJUSTMENT IN A SLOW-RUNNING ALTERNATOR

BACKGROUND OF THE INVENTION

The invention concerns a device for the voltage adjustment in a self-energized and self-regulated single-phase alternator when said alternator is working at a reduced speed with respect to the rated one.

It is known that especially single-phase alternators, coupled to endothermic motors e.g. alternator traction mortor or engine, not shown, and having a low capacity, for example 1 to 10 kW, are variously used, for example during markets or during open-air maintenance-repairs for which it is necessary to use electric tools and it is difficult to have a nearby electric power supply.

The alternators which are used that way undergo very changeable loads. Generally alternators work mostly loadless because loads are connected just occasionally to them. That is why it is important, in the operation of units using these alternators, to obtain both energetic saving, that is a decrease in the consumption of the alternator traction motor, and a decrease in the air and noise pollution. Therefore it is important that, when the alternators work loadless, their speed is drastically reduced, so that all the polluting emissions, the noise, as well as the fuel consumption, are decreased.

It is known that there are solutions for obtaining the above-mentioned result in alternators in which the adjustment of the current of the alternator inductive circuit is carried out directly, so that the increase or the decrease of the traction motor speed cause proportional increases or decreases of the outgoing voltage. In single-phase alternators the adjustment often is not made directly, but through a capacitor. Said single-phase alternators have a excitation winding placed at 90° with respect to the power winding. The excitation winding is closed on a capacitor.

The function linking the speed of the alternator traction motor to the outgoing voltage in the machines having this type of check is not linear. In fact the result is that, in case of a reduction of the motor speed, a much higher per cent reduction of the voltage is produced, so much that it makes the restart of certain loads impossible. It is important that the voltage is not over-decreased. Sometimes this is necessary because the outgoing voltage of the alternator powers the loads connected to it, as well as the electronic circuits connected to the alternator. Said electronic circuits need a threshold voltage which is not lower than a certain value.

That is why it is important and necessary that the alternator voltage, even if it is reduced because of the decrease of the traction motor speed, has not lower value than the half of the rated voltage or just above. For example in case of an alternator supplying a load at 220 Volt it is important that its loadless and reduced speed voltage is not lower than 100–120 Volt. In order to remedy the above-mentioned drawback single-phase alternators of the known type adjusted through a capacitor either cannot reduce the motor speed or supply a speed reduction at not very low values, just in order to avoid an over-reduction of the outgoing voltage.

SUMMARY OF THE INVENTION

The aim of the invention is that of overcoming the above-mentioned drawbacks.

One of the aims of the invention is that of realizing a device which can reduce the speed of the alternator traction motor between 50% and 75% of the rated speed when the load current is almost zero, without decreasing the value of the alternator terminal voltage substantially over the half of the rated voltage. Another aim is that the adjustment of the invention does not intervene too immediately in case of load lack, but after a delay of some seconds, in order to allow the working of intermittent loads.

Another aim of the adjustment device of the invention is that of granting the return to normal working conditions, that is to the rated voltage and to the rated speed in the presence of even a low load.

All the above-mentioned aims and others which will be better underlined later on are achieved by a device for the adjustment of the terminal voltage of a single-phase alternator coupled to an endothermic motor, said device including a current sensor of the alternator load transferring a signal to the entry of a comparator logic circuit, said comparator circuit emitting a first outgoing signal suitable for controlling a shutter connected to the accelerator of the endothermic motor, the device being characterized in that said comparator circuit, in case of a substantial loss lack and of reduced revolutions per minute, emits a second electric signal suitable to close a switch connecting at least an auxiliary capacitor to the excitation circuit of the alternator, so that the excitation current causes a voltage to the alternator terminals substantially not lesser than 50% of the rated voltage.

BRIEF DESCRIPTION OF THE DRAWINGS

Further features and particularities of the invention will be better underlined in the description of an embodiment of the invention given approximately but not restrictively, and shown in the enclosed drawings where driven by an alternated fraction motor.

DESCRIPTION OF THE INVENTION

Figure 1:
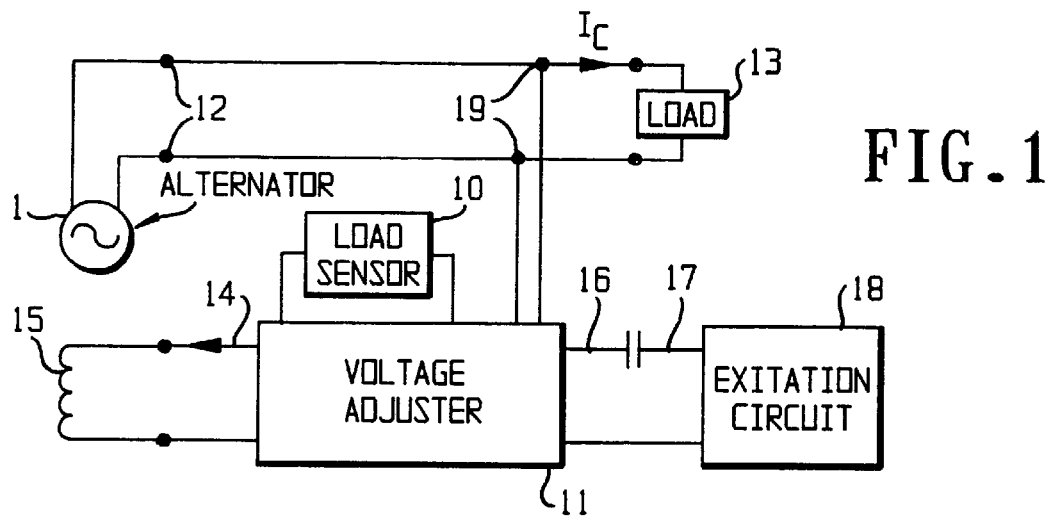
FIG. 1 shows a principle diagram of the device of the invention.

Referring to the mentioned drawings it can be observed that the alternator 1 is connected through its own outgoing terminals 12 to a load 13, so that a current Ic is determined in the input circuit. Such a current Ic is detected by a load sensor 10, for example a current transformer. An ingoing signal goes through said sensor 10 to the voltage adjusting device of the invention, marked with 11, for adjusting the voltage. Such a device, when the sensor of the load current 10, emits two outgoing signals, a signal 14 and a signal 16. The signal 14 will control the actuators 15 adjusting the endothermic motor speed by decreasing it. The signal 16 will control an auxiliary capacitor 17 connected to the excitation circuit, so that the current circulating wherein makes the terminal voltage 12 of the alternator not lower than the half of the rated voltage.

Figure 2:
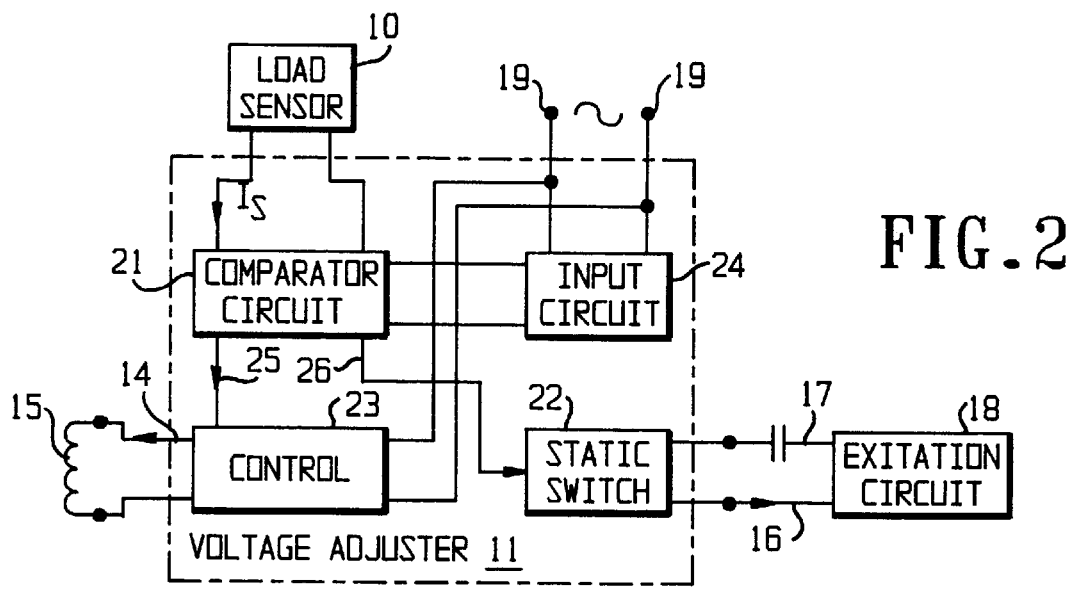
FIG. 2 shows a block diagram of the device of the invention.

The voltage adjuster device 11 of the invention is powered through connections 19 resulting from the connection with the outgoing terminal voltage 12 of the alternator 1. More particularly, in the block diagram of FIG. 2, the device 11 of the invention is powered through the terminals input 19 input current, which in turn power both a comparator circuit 21, and a control circuit 23 of the actuator connected with the accelerator of the alternating traction motor, not shown. More particularly the signal Is coming from the load current sensor 10, is coupled to the input of the comparator circuit 21, which, in a known manner, may be, provided with a hysteresis circuit (not shown) and with a possible delay line (not shown), in order to absorb, transient signals resulting from, possible instantaneous load variations or intermittent loads. From said comparator circuit 21 two signals 25 and 26 come out: the signal 25 operates the control 23 relative to the coil 15 of the accelerator, while the signal 26, in case of load lack, closes the static switch 22 and therefore puts the auxiliary capacitor 17 in parallel with the excitation circuit.

The static switch 22 can be advantageously be a SCR component, or a TRIAC component or an IGBT component.

Figure 3:
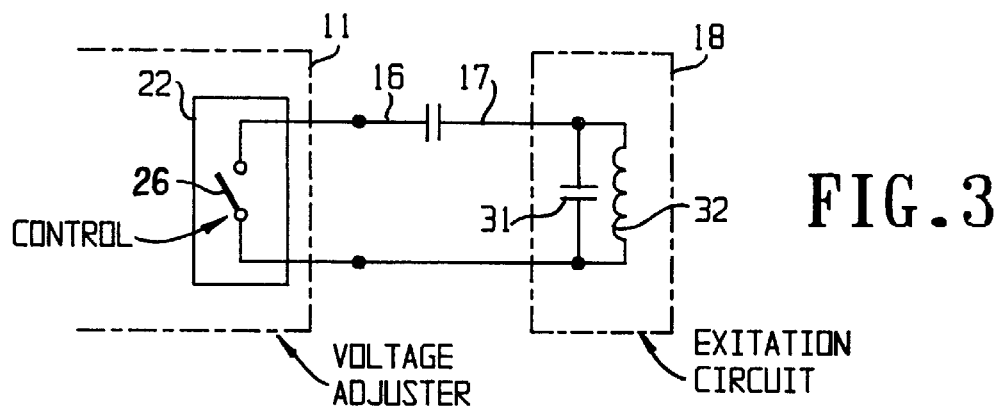
FIG. 3 shows a detail of the circuit realizing the invention.

FIG. 3 shows more particularly and schematically how the excitation circuit 18 is built and how the auxiliary capacitor 17 is connected to it. In fact in this case the closing of the static switch 22 by the control 26 in case of load puts the auxiliary capacitor 17 in parallel with the excitation capacitor 31 forming, together with the excitation winding 32, the excitation circuit of the alternator 1.

Another embodiment not shown in the enclosed drawings has the auxiliary capacitor 17 connected through a switch in parallel with respect to a winding 32 of the excitation circuit 18.

As it is clear, by increasing the whole capacity of the excitation circuit of the alternator, the current circulating in the excitation circuit increases as well. Consequently the induced voltage at the terminal 12 of the alternator increases too. This is the result that was aimed at and as it can be observed such an effect is obtained rather simply and by practical means.

It is important to underline that the comparator circuit 21 should be provided with a certain delay so that the loads variations, due for example to an intermittent load or to a rather sudden load connection or disconnection, does not trouble the speed rate of the traction motor of the alternator and consequently does not trouble even the caution at the alternator terminals.

What is claimed is:

1. A device for adjusting the terminal voltage of a single-phase alternator having a selected rated voltage and a variable terminal voltage when driven, said alternator having an exciter and being adapted to be coupled to a mechanical device for driving the alternator and having an accelerator for selectively operating the device at variable speeds, said alternator being subject to a variable load, said device including a current sensor response to the load for producing a load signal indication of drive speed;

a comparator logic circuit responsive to the load signal for producing a first signal;

a control adapted to be connected to the accelerator and a second signal responsive to a substantial reduction in drive speed;

a switch and an auxiliary capacitor connected to the exciter, said switch responsive to the second signal to close the switch for connecting the auxiliary capacitor to the exciter, for causing the alternator terminal voltage to be not less than 50% of the rated voltage.

2. The device according to claim 1 wherein said comparator circuit has a hysteresis such that, in response to variation in the load, the first and second signals occur after a selected time delay resulting in a corresponding delay in the change of the terminal voltage and resulting change in the drive speed.

3. The device according to claim 1 wherein said switch comprises an electronically controlled switch.

4. The device according to claim 3 wherein the static switch comprises a silicon controlled rectifier.

5. The device according to claim 3 wherein the static switch comprises a at least one of a triac and an insulated gate bipolar transistor.

6. The device according to claim 1 wherein the capacitor is coupled in parallel with respect to said exciter.

7. The device according to claim 1 wherein the exciter includes a winding and the capacitor is connected through said switch in parallel with respect to said winding.

8. A device for adjusting the terminal voltage of a single phase alternator adapted to be operatively coupled to a drive having a variable speed, said alternator having a selected rated voltage and being connectable to a variable load, said alternator having an exciter and said drive having an accelerator for varying the speed of the drive comprising:

a current sensor responsively coupled to the load for producing a signal corresponding to a changing load current;

a comparator logic circuit for producing first and second signals responsive to the changing load current;

a control responsive to the first signal and operative for actuating the accelerator in case of a substantial reduction in drive speed;

an auxiliary capacitor for the exciter;

a switch responsive at the second signal for connecting the auxiliary capacitor to the exciter for producing an excitation current causing the alternator to produce the output voltage in an amount not less than 50% of the rated voltage.

9. The device according to claim 8, wherein said comparator includes a hysteresis circuit for introducing a selected delay between the first and second signals such that variation in the load results in a delayed change in the terminal voltage of the alternator corresponding to a change in the drive speed.

10. The device according to claim 8, wherein the control comprises an electronically controlled static switch.

11. The device according to claim 10, wherein the switch comprises an silicon controlled rectifier.

12. The device according to claim 10, wherein the switch comprises at least one of a triac and an insulated gate bipolar transistor.

13. The device according to claim 10, wherein the switch is parallel with the exciter.

14. The device according to claim 10, wherein the switch is serially connected between the compacitor and the exciter.

15. The device according to claim 14, wherein the exciter comprises a semi.

* * * * *